United States Patent [19]

Leliaert

[11] 3,934,374
[45] Jan. 27, 1976

[54] SAND RECLAMATION SYSTEM
[75] Inventor: Raymond M. Leliaert, South Bend, Ind.
[73] Assignee: Wheelabrator-Frye, Inc., Mishawaka, Ind.
[22] Filed: Aug. 21, 1974
[21] Appl. No.: 499,312

[52] U.S. Cl. .................................. 51/9 R; 51/15
[51] Int. Cl.² ........................ B24C 3/14; B24C 7/00
[58] Field of Search .......... 51/8 R, 9 R, 14, 15, 319, 51/320, 8; 241/DIG. 10; 209/32, 146

[56] References Cited
UNITED STATES PATENTS

| | | | |
|---|---|---|---|
| 2,452,362 | 10/1948 | Erisman | 241/DIG. 10 |
| 3,005,547 | 10/1961 | Freeman | 222/335 X |
| 3,690,066 | 9/1972 | Rowe | 51/9 R |
| 3,694,964 | 10/1972 | Bowling | 51/9 R |
| 3,716,946 | 2/1973 | Graf | 51/9 |
| 3,742,650 | 7/1973 | Graf et al. | 51/9 R X |
| 3,782,643 | 1/1974 | Carpenter | 241/DIG. 10 |

Primary Examiner—Donald G. Kelly
Attorney, Agent, or Firm—McDougall, Hersh & Scott

[57] ABSTRACT

A sand reclamation system is disclosed for reconditioning and sizing sand utilized in precision molding. The system includes particulate blasting wheels for breaking down the sand molds and reducing them to discrete particles. A conveyor, a first air wash for separating the particulate used for blasting from the granular sand and a second special air wash for separating undersized sand particles from those which may be reused for further molding. The second air wash utilizes a modified air wash separator employing a surge by-pass arrangement to insure a constant feed rate therethrough.

6 Claims, 5 Drawing Figures

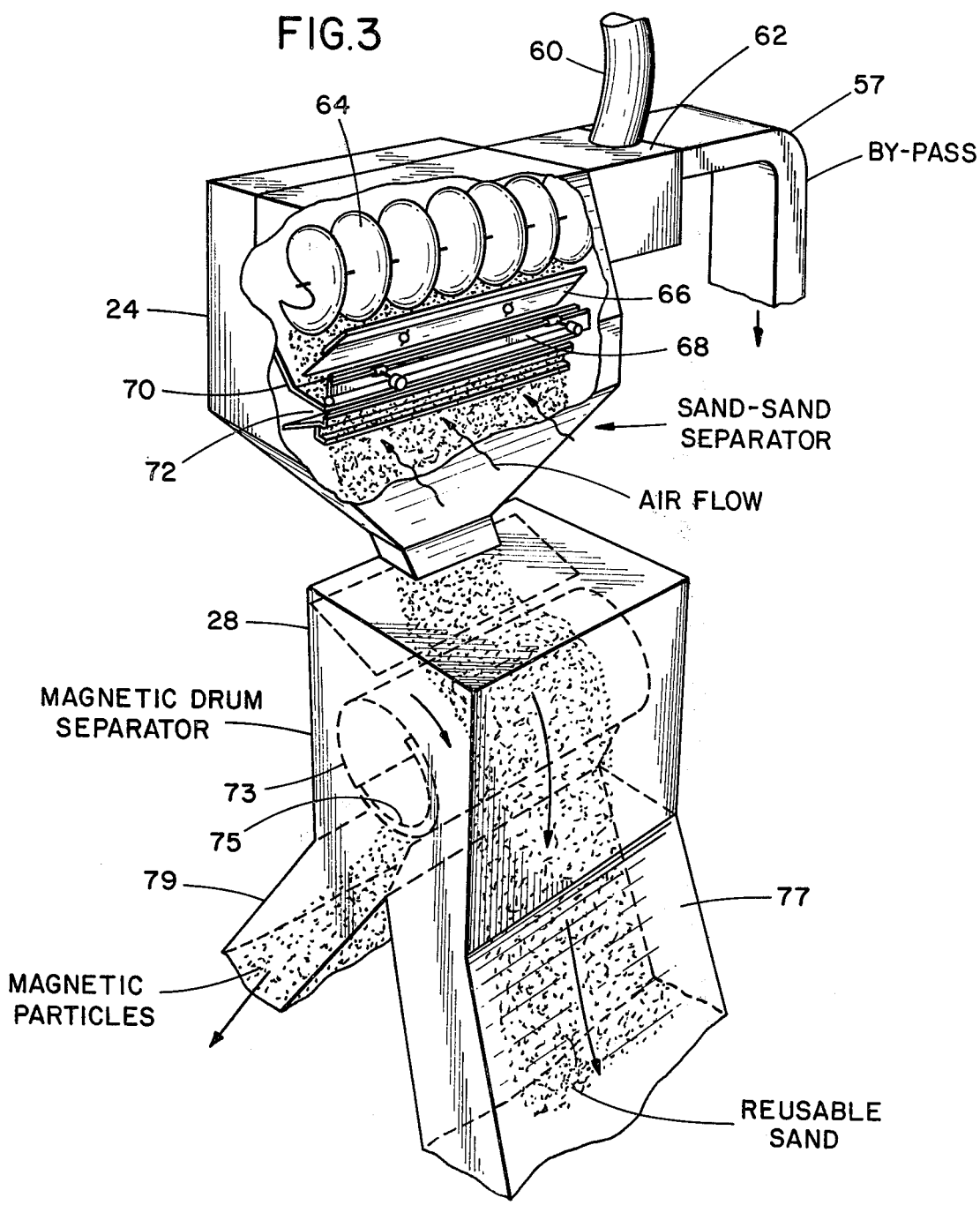

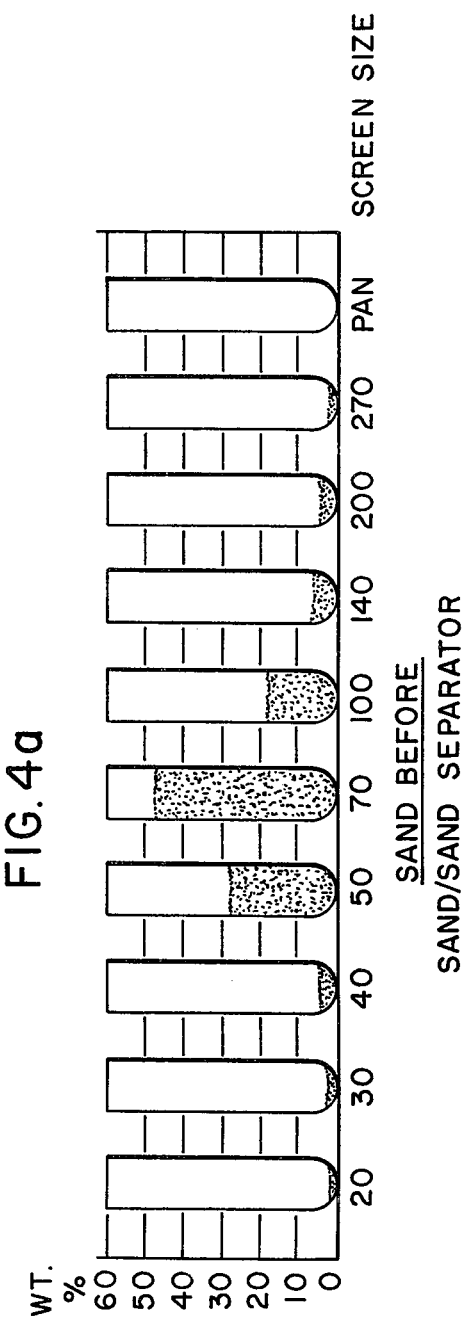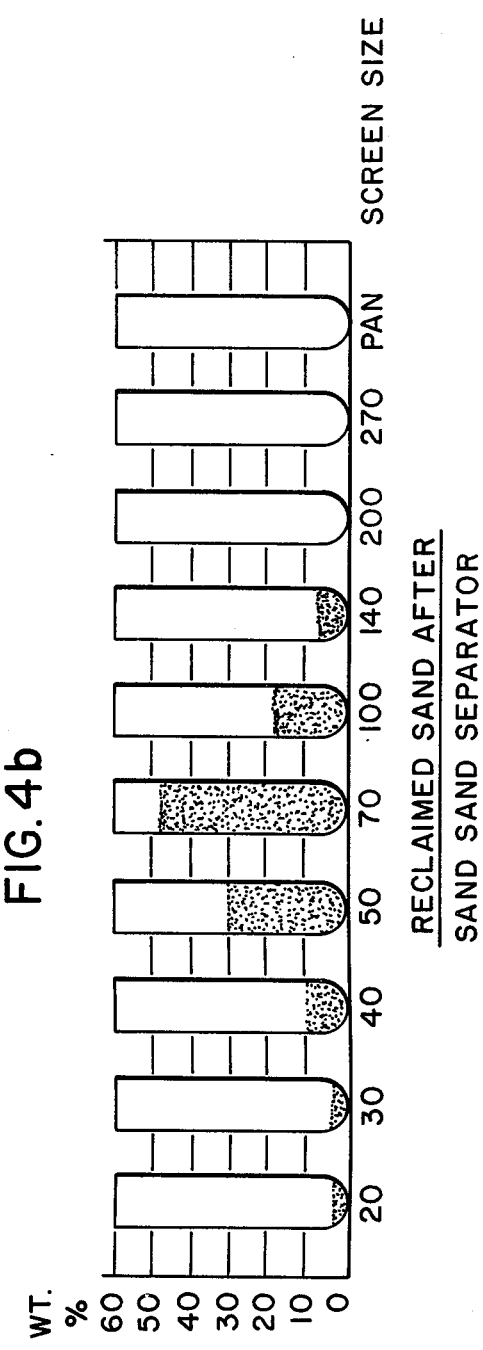

SAND RECLAMATION SYSTEM

BACKGROUND OF THE INVENTION

This invention relates to the field of chemically bonded molds. Particularly, the present invention relates to the release of precision cast parts from molds formed of high quality sand, a chemical binder and a catalyst which are hardened into a solid mold. When it is desired to remove the cast part from the mold, the mold shell can be removed as by blasting. This technique has the advantage that, in addition to removing the mold, the finish of the casting is improved. In order to use this technique, it is necessary to use high quality sand which may cost significantly more than coarse or green sand. Thus it is very desirable to reclaim the sand used in the molding process for reuse. The problem with reclaiming and reusing the sand is a buildup of fines and organic contaminants which increase the loss on ignition (LOI) of the sand and reduce its qualities as a high performance molding material.

Over a period of time the high quality sand breaks down through the repeated molding and blasting process into a fine dustlike material. This phenomenon is objectionable in that it adversely affects the mold strength and casting quality. Thus it is desirable to reduce the buildup of contaminants on the individual sand grains and to further maintain the initial screen size distribution of sand particles by removing particles which are of insufficient size.

In U.S. Pat. No. 3,716,947 to Carpenter et al. there is disclosed an abrasive cleaning system wherein sand molds are subjected to an abrasive blast for breaking the mold into small lumps. The lumps are then conveyed on a vibrating conveyor to a second blasting station where the lumps are broken down into individual discrete particles. By means of various elevators and screw conveyors, the material is conveyed to air wash separators for separating the sand from the particulate or abrasive shot. While such a device accomplishes its intended purpose, it does not provide means for maintaining a desired screen size distribution and further, it requires a plurality of blasting stations to break the sand down into discrete particles. Further, as indicated by U.S. Pat. No. 3,782,643, a continuation-in-part of the first-mentioned patent, there is an insufficient reduction in the contamination of the sand particles when the two-stage blasting technique is utilized. Thus, in order to compensate and further reduce the LOI problem, an additional technique for cleaning the sand is necessary, as disclosed in the second mentioned patent.

OBJECTS OF THE INVENTION

It is accordingly an object of the present invention to provide a sand reclamation system which is simpler and more efficient in operation.

It is a further object of the present invention to provide a sand reclamation system which is capable of breaking a sand mold into discrete sand particles with one blasting application.

It is another object of the present invention to provide a sand reclamation system utilizing a blasting chamber wherein the force of the particulate blast on a sand mold exceeds the bonding energy of the sand particles in the mold to thereby reduce the sand to individual discrete particles.

It is another object of the present invention to provide a sand reclamation system capable of maintaining a desired screen size distribution of sand particles in the reclaimed sand.

It is another object of the present invention to provide a sand reclamation system utilizing a compensated flow sand-sand air wash separator for separating out sand particles too small to be used further in a molding operation.

Other objects and advantages of the invention will be apparent from the concluding portion of the specification.

BRIEF DESCRIPTION OF THE DRAWINGS

FIG. 3 is a perspective view, having portions cut away, of the sand-sand separator and the magnetic drum separator of the present invention; and FIGS. 4A and 4B are comparative charts illustrating the effect of the sand-sand separator in maintaining a desired screen size distribution of reclaimed sand.

DETAILED DESCRIPTION

Figure 1:
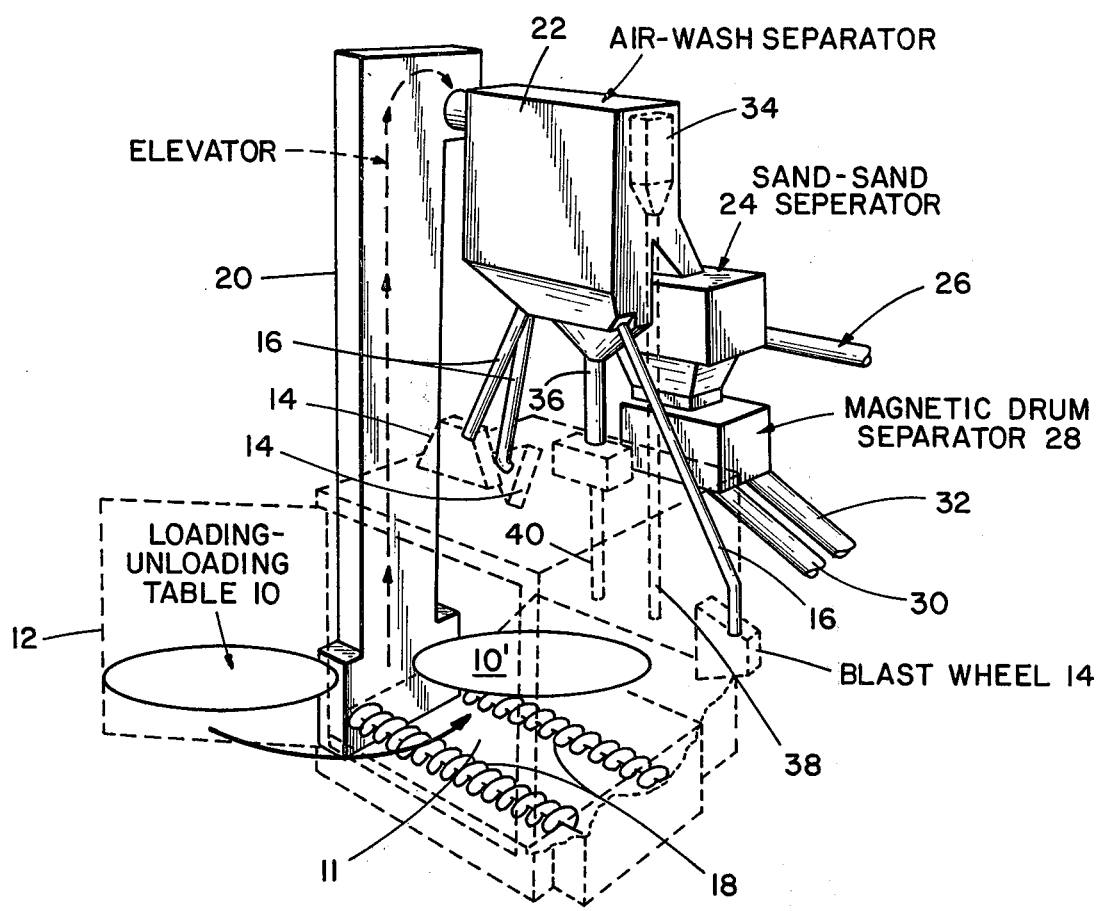
FIG. 1 is a perspective view of a sand reclamation device according to the present invention.

Referring to FIG. 1, the sand reclamation system of the present invention is illustrated. Sand molds to be subjected to a particulate blast are placed on a load table 10 which is secured to a loading door 12. When the door 12 is in a closed position, the table 10 is as indicated by the numeral 10' and the door seals the blast chamber 11 to prevent the particulate material from escaping into the surrounding area. The blasting is produced by one or more centrifugal blasting wheels 14 of known construction. For example, the centrifugal blasting wheels manufactured by Wheelabrator-Frye, Inc. of Mishawaka, Ind., are suitable for the purpose. These devices receive particulate material such as steel shot, grit, or other abrasive materials via supply lines 16. The abrasive is supplied to the center of the wheel from whence it is thrown with high velocity downwardly into the chamber 11 where it strikes the molds resting on the table 10'. Depending upon the size and design of the blasting wheels, the abrasive may be thrown with selectable velocities. Furthermore, the diameter or screen size of the abrasive may also be varied for a purpose now to be described.

As mentioned, it has previously been necessary to first break a sand mold into lumps and then in a second operation subject it to an abrasive blast for reducing it into discrete particles. In the present invention, only a single blasting step is required due to the use of blasting wheels operating at sufficiently high velocities and with particulate materials chosen such that the kinetic energy of the particulate thrown at the molds exceeds the bonding strength of the sand particles in the molds. This completely breaks down the mold into discrete sand particles in a single operation. After the molds have been broken open, the blasting wheels are turned off and the door 12 opened to remove the parts from the loading table. As thus far described, the device operates in a batch mode wherein a number of molds are placed into the device and then subsequently removed. It will be apparent that, if desired, a continuous assembly line type of operation could be employed by utilizing conveying means to convey a continuous stream of molds into the blasting chamber.

As the mold breaks down into discrete sand particles, the particles fall downwardly onto the floor of the blasting chamber 11. These particles have been subjected to an abrasive blast of a magnitude sufficient not only to separate them from the mold but also to substantially reduce the buildup of organic materials adhering to the surface of the individual sand grains. These partially cleansed particles and the spent abrasive are then conveyed by means of screw conveyors 18 to the boot of a belt and bucket elevator 20. The sand grains and abrasive are picked up by the elevator 20 and conveyed upwardly and thence into a multi-stage air wash separator 22. The separator 22, as will be described, is effective for separating the particulate material from the sand grains and for subsequently returning the particulate to the blast wheels for reuse. The sand, after separation from the particulate in the air wash separator 22, is passed downwardly into a sand-sand air wash separator 24 which is effective for classifying the sand according to the screen size; that is, undersized sand as well as any undersized abrasive which has not been removed by the separator 22, is separated out and sent to a refuse collecting bin via a conduit 26. Sand which is of a screen size distribution suitable for reuse is passed downwardly into a magnetic drum separator 28 for removing any last traces of magnetic materials such as scraps, trash, abrasive and the like which contaminate the sand. The magnetic refuse is collected and sent to a scrap bin via conduit 30. Sand which is of a proper screen size and which is now free from magnetic trash and the like, passes out of the separator 28 via conduit 32 to a collection bin where it is stored for subsequent reuse in the molding process.

In order for the air wash separators 22 and 24 to operate in a satisfactory manner, it is necessary to provide surge bypass devices such that when an excessive amount of material is provided to the separators, this material can be returned to the blasting chamber 11 for recycling until the separators catch up. In this manner the separators can operate in a more efficient and effective manner. For this purpose bypasses 34 and 36 are provided on the air wash separator 22. The bypass 34 receives excessive amounts of sand and abrasive passing into the separator 22 and deposits the mixture back into the blast chamber 11 via conduit 38. Surge device 36 receives excessive abrasive which accumulates as the air wash separator operates and similarly returns the excess abrasive back to the blast chamber 11 via conduit 40. As will be described, similar provisions are made for the sand-sand separator 24.

Figure 2:
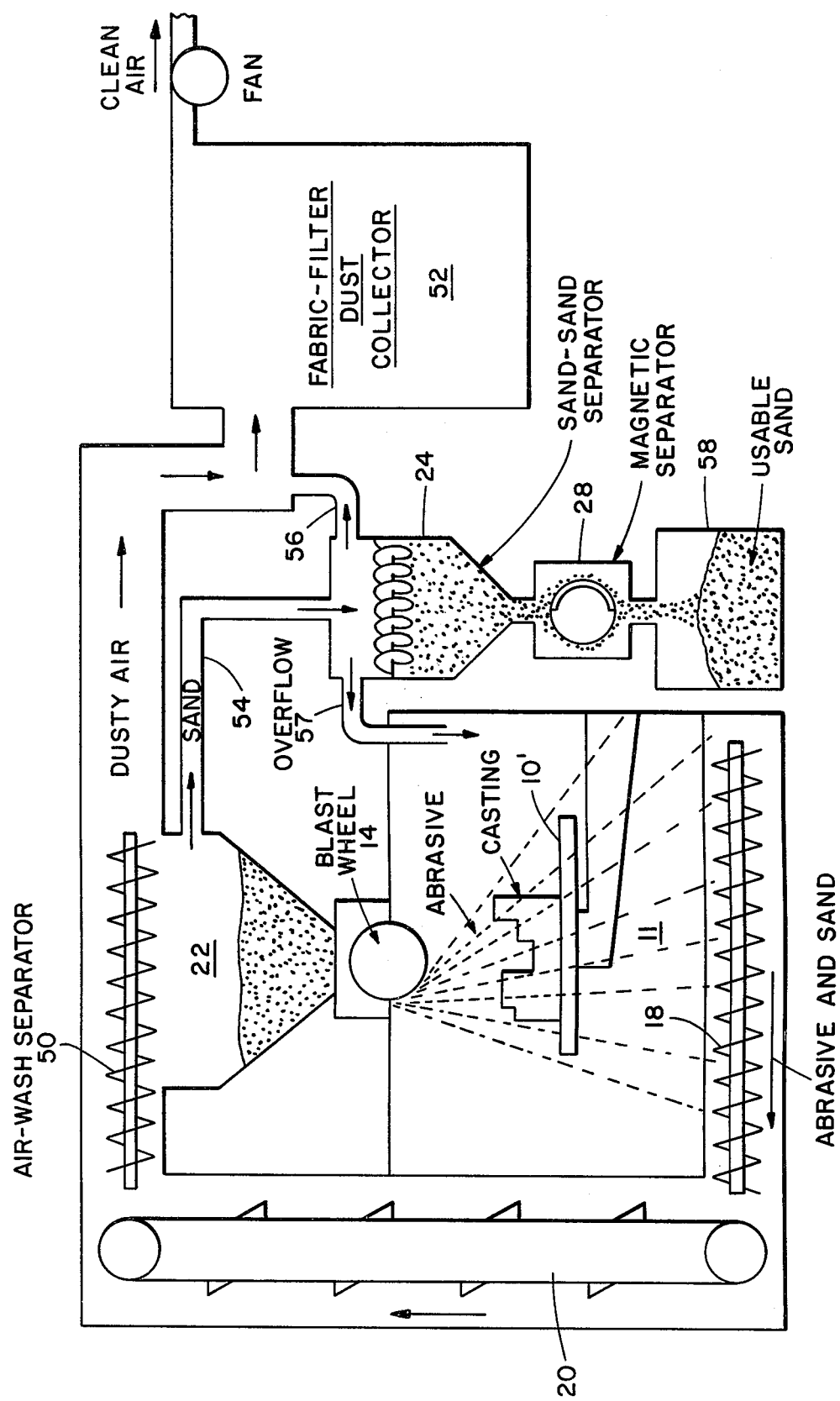
FIG. 2 is a schematic diagram illustrating the operation of the device of FIG. 1.

Referring now to FIG. 2, a schematic flow diagram of the operation according to the present device is illustrated. For this figure, like numerals from FIG. 1 have been used throughout. The castings from which the molds are to be removed are placed on the table 10' and subjected to an abrasive blast by blasting wheel 14. The mixture of sand and abrasive is collected in the bottom of the blast chamber 11 by screw conveyors 18. The screw conveyors convey the material to a belt and bucket elevator 20 at the top of which is a further screw conveyor 50 for conveying the material into the air wash separator. As shown in FIG. 2, the air wash separator is preferably provided with an air filtering system for removing the dust. The filtering system includes a suction fan for drawing the dusty air through a conduit to a dust collector 52.

Sand, regardless of screen size, is separated by the air wash separator 22 from the abrasive and is fed via conduit 54 to the sand-sand separator 24. Additionally, any material precipitating out of the air stream going to the dust collector is also fed to the sand-sand separator 24 via conduit 56. A surge device which will be described subsequently provides for returning any sand which overflows from the sand-sand separator 24 to the blasting chamber 11 via 57. After separation by the air wash separator 22, the sand, which is of a proper screen size, is next passed through a magnetic separator 28 for removing magnetic trash and fines. Finally, the resuable sand is collected in a bin 58 for reuse.

Referring now to FIG. 3, the construction details of the sand-sand separator 24 and the magnetic drum separator 28 are disclosed in greater detail. The sand-sand separator 24 is illustrated as a singly lip air wash separator. It will be apparent to those skilled in the art, however, that if desired, a two, three or four-stage separator could be employed, particularly where it is desirable to cool the sand at the same time that the size classifying process is being carried out. Sand-sand separator 24 receives sand via conduit 60 from the air wash separator 22. The sand enters the separator 24 through an overflow device 62 to be described subsequently. As the sand enters, it is picked up by a screw conveyor 64 and carried substantially across the width of the separator.

The separator is provided with an upper fixed baffle 66 and a swinging counterweighted baffle 68. The swinging baffle is mounted to a trough-like structure 70 adapted to support the sand as it is moved into the separator by the screw conveyor 64. The angular relationship of the baffles 66 and 68 is such that sand is prevented from spilling over the edge 72 of the trough 70 until a sufficient amount of sand is present to displace the swinging baffle 68 due to the force of the sand thereon. This configuration is similar to the device shown and described in U.S. Pat. No. 3,005,547 assigned to the present assignee and incorporated hereby.

Use of this arrangement wherein sand is forced substantially along the length of the separator before it can build up sufficient pressure to displace the swinging baffle 68 produces a full width curtain of falling sand. As the sand passes downwardly, as disclosed in more detail in the referenced patent, an air curtain passes across the path of the sand effecting a separation according to the density of the particles; that is, the heavier sand particles are displaced by an amount less than the lighter particles. The lighter particles are displaced from a vertically downward path sufficiently so that they pass into a bin for discarded sand (not shown). The heavier particles which are of sufficient size for reuse pass nearly vertically downwardly into the magnetic drum separator 28.

The overflow device 62 is provied at either the inlet or the side opposite the inlet to the sand-sand separator and provides for a controlled feed rate of sand to the separator. The device includes a bypass conduit 57 for permitting excessive amounts of sand to flow back to the machine for recirculation through the system. This is necessary so that the processing rate of the sand-sand separator can be maintained within acceptable limits to insure a satisfactory screen size distribution.

In comparing the sand-sand separator structure with that of the main air wash separator 22, the following points should be noted. The main air wash separator 22 is utilized for separating materials of different composition and density, namely sand from abrasives such as steel or ferrous shot or grit. This is essentially a coarse type of separation in that there is significant difference in the screen sizes as well as the densities of the properties to be separated. The feed rates of the main separator 22 may be substantially different, i.e., higher, than in the sand-sand separator 24.

In the sand-sand separator 24 what is effectively a very sensitive separating operation is performed. The feed rate is very accurately controlled within prescribed limits by the employment of the overflow device 62 to prevent excessive amounts of sand from being fed in and by the swinging baffle arrangement 68 which prevents insufficient or excessive amounts of sand from passing through the device. Thus the device operates at a feed rate which is very narrowly controlled so that the air flow rate through the separator can be accurately preset to effect a desired screen sized distribution separation of the sand passing through the separator. A specific example is shown in FIGS. 4A and 4B wherein a comparison is illustrated between the screen size distribution of sand without the use of a sand-sand separator and the screen size distribution with the use of the sand-sand separator 24.

As shown in FIG. 3, the overflow device 62 preferably receives the sand from conduit 60 and acts as a feed bin into the sand-sand separator. Alternately, the overflow device may be at the opposite end of the separator and receive excess sand from the screen conveyors. Excessive amounts of sand, which exceed the rate at which the separator can accept it, accumulate in the overflow device 62 until they reach a preset level at or above the bypass 57. Any further excess accumulation of sand passes into the bypass conduit 57 and is returned to the blast chamber.

From the sand-sand separator, the sand having at least the minimum selected screen size passes downwardly into the magnetic separator 28. The separator is of a known construction and channels the sand to the top side of a rotating drum 73. The magnetic separator removes any ferromagnetic fines such as broken down shot, small particles of trash, etc., which in spite of the separating devices remains mixed with the reusable sand. The device may have a semi-cylindrical magnet 75 or alternating pole magnets positioned inside the periphery of the drum 73 to cause the magnetic particles to be attracted to the drum whereas the sand falls off the drum and passes downwardly through the conduit 77. The magnetic trash remains attracted to the drum as it rotates in the direction indicated by the arrow until the drum reaches a position beyond the magnet 75. This breaks the magnetic attraction force permitting the magnetic trash and fines to fall downwardly into a second conduit 79.

As mentioned previously, one of the main objects of the present invention is to maintain a desired screen profile for the sand. In casting operations, it is of primary importance that the screen sized distribution profile be maintained within the specification set for new sand. In usage, the sand slowly breaks down to finer fractions due to the handling, mixing, molding and thermal reaction as well as during the metal pouring shakeout and reclaiming of the sand. The fines generated by these operations do not fit into the specified screen size distribution profile and thereby must be removed. As shown in FIG. 4A, the sand profile of reclaimed sand from a molding operation without the use of a sand-sand separator has a profile which includes measurable percentage of sand fines able to pass a 140 mesh or better screen. As shown in FIG. 4B, by use of a sand-sand separator these objectionable sand fines are substantially eliminated, thereby to maintain the reusable sand at a selected minimum screen size.

While I have shown and described embodiments of this invention in some detail, it will be understood that this description and illustrations are offered merely by way of example, and that the invention is to be limited in scope only by the appended claims.

I claim:

1. A sand reclamation system for breaking sand molds into discrete particles for reuse and for maintaining a selected minimum particle size, comprising:
    a. a blast chamber receiving said molds for confining the blast therein;
    b. means for throwing particulate at said molds to break them down into discrete particles;
    c. means for conveying the spent particulate and sand particles from said blast chamber;
    d. a first air wash separator for separating said sand particles from said particulate; and
    e. a second air wash separator for separating sand particles to remove particles which are smaller than said selected minimum size, said second separator including counterweight means for maintaining a minimum flow rate through said separator and bypass means for returning excessive amounts of sand to said blast chamber to limit the flow rate of sand into said second separator, thereby to obtain a relatively constant volume of sand particles through said second separator to obtain precise separation of said particles by size.

2. The system according to claim 1 wherein the means for throwing particulate are a plurality of centrifugal blasting wheels.

3. The system according to claim 1 wherein said first air wash separator is provided with bypass means for returning excessive amounts of sand and particulate to said blast chamber.

4. The system according to claim 1 wherein said particulate if ferromagnetic material and said system further includes:
    means receiving the sand from said classifying means for removing any remaining particulate and magnetic trash therefrom.

5. The device according to claim 4 wherein said receiving means is a magnetic separator.

6. The device according to claim 1 wherein said conveying means includes at least one screw conveyor in said blast chamber, a belt and bucket elevator receiving the sand and particulate from said screw conveyor and carrying it to said separating means.

* * * * *